(12) United States Patent
Mellet et al.

(10) Patent No.: US 8,651,996 B2
(45) Date of Patent: Feb. 18, 2014

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/737,074

(22) Filed: Jan. 9, 2013

(65) Prior Publication Data

US 2013/0203548 A1    Aug. 8, 2013

Related U.S. Application Data

(60) Provisional application No. 61/594,617, filed on Feb. 3, 2012.

(51) Int. Cl.
*F16H 3/62* (2006.01)

(52) U.S. Cl.
USPC .......................................... 475/276; 475/280

(58) Field of Classification Search
USPC .......... 475/275, 276, 280, 286, 287, 323–325
See application file for complete search history.

(56) References Cited

U.S. PATENT DOCUMENTS

| | | | |
|---|---|---|---|
| 6,991,578 B2 | 1/2006 | Ziemer | |
| 7,011,597 B2 | 3/2006 | Haka | |
| 7,018,319 B2 | 3/2006 | Ziemer | |
| 7,621,841 B2* | 11/2009 | Kim | 475/287 |
| 8,409,045 B1* | 4/2013 | Mellet et al. | 475/280 |
| 2009/0270219 A1* | 10/2009 | Kim | 475/276 |
| 2011/0207575 A1* | 8/2011 | Kraynev et al. | 475/297 |
| 2013/0085032 A1* | 4/2013 | Mellet et al. | 475/275 |

* cited by examiner

*Primary Examiner* — Justin Holmes

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices include four clutches and three brakes actuatable in combinations of two to establish a plurality of forward gear ratios and one reverse gear ratio.

15 Claims, 2 Drawing Sheets

| GEAR STATE | GEAR RATIO | RATIO STEP | TORQUE TRANSMITTING ELEMENTS ||||||| 
|---|---|---|---|---|---|---|---|---|---|
| | | | 24 | 32 | 30 | 26 | 36 | 34 | 28 |
| REV | -3.271 | | | | X | | X | | |
| N | | -0.76 | | | | | O | | |
| 1ST | 4.299 | | X | | | | X | | |
| 2ND | 2.523 | 1.70 | X | X | | | | | |
| 3RD | 2.021 | 1.25 | X | | | | | X | |
| 4TH | 1.635 | 1.24 | X | | X | | | | |
| 5TH | 1.173 | 1.39 | X | | | | | | X |
| 6TH | 1.000 | 1.17 | X | | | X | | | |
| 7TH | 0.925 | 1.08 | | | | X | | | X |
| 8TH | 0.855 | 1.08 | | | X | X | | | |
| 9TH | 0.837 | 1.02 | | | | X | | X | |
| 10TH | 0.667 | 1.26 | | X | | X | | | |

X = ON - ENGAGED CARRYING TORQUE
O = ON - ENGAGED NOT CARRYING TORQUE

MULTI-SPEED TRANSMISSION

CROSS-REFERENCE TO RELATED APPLICATIONS

This application claims the benefit of U.S. Provisional Application No. 61/594,617 filed Feb. 3, 2012. The disclosure of the above application is incorporated herein by reference.

FIELD

The invention relates generally to a multiple speed transmission having a plurality of planetary gear sets and a plurality of torque transmitting devices and more particularly to a transmission having ten or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In one example the transmission includes an input member, an output member, first, second, third and fourth planetary gear sets each having first, second and third members, wherein the second members of the first and second planetary gear sets are rotationally coupled and the third members of the first and second planetary gear sets are rotationally coupled, and wherein the input member and the output member are each continuously interconnected to at least one of the first, second, and third members of the first, second, third, and fourth planetary gear sets. A first interconnecting member continuously interconnects the first member of the second planetary gear set with the second member of the fourth planetary gear set. A second interconnecting member continuously interconnects the first member of the third planetary gear set with the first member of the fourth planetary gear set. A third interconnecting member continuously interconnects the third member of the third planetary gear set with a stationary member. A first torque transmitting mechanism is selectively engageable to interconnect the first member of the first planetary gear set with the second member of the third planetary gear set. A second torque transmitting mechanism is selectively engageable to interconnect the third member of the first planetary gear set and the third member of the second planetary gear set with the first member of the fourth planetary gear set and the first member of the third planetary gear set. A third torque transmitting mechanism is selectively engageable to interconnect the first member of the third planetary gear set and the first member of the fourth planetary gear set with the third member of the fourth planetary gear set. A fourth torque transmitting mechanism is selectively engageable to interconnect the second member of the third planetary gear set with the first member of the second planetary gear set and the second member of the fourth planetary gear set. A fifth transmitting mechanism is selectively engageable to interconnect the first member of the second planetary gear set and the second member of the fourth planetary gear set with the stationary member. A sixth torque transmitting mechanism is selectively engageable to interconnect the third member of the fourth planetary gear set with the stationary member. A seventh torque transmitting mechanism is selectively engageable to interconnect the third member of the first planetary gear set and the third member of the second planetary gear set with the stationary member. The seven torque transmitting mechanisms are selectively engageable in combinations of at least two to establish at least ten forward speed ratios and at least one reverse speed ratio between the input member and the output member.

In another example of the present invention, the input member is continuously connected for common rotation with the first member of the third planetary gear set and with the first member of the fourth planetary gear set.

In yet another example of the present invention, the output member is continuously connected for common rotation with the second member of the first planetary gear set and the second member of the second planetary gear set.

In yet another example of the present invention, the third member of the third planetary gear set and the first members of the first, second, and fourth planetary gear sets are sun gear members, the first member of the third planetary gear set, the second member of the fourth planetary gear set, and the third members of the first and second planetary gear sets are carrier members, and the second member of the third planetary gear set, the third member of the fourth planetary gear set, and the second members of the first and second planetary gear sets are ring gear members.

In yet another example of the present invention, the second members of the first and second planetary gear sets form a single ring gear member and the third members of the first and second planetary gear sets form a single carrier member.

In yet another example of the present invention, a selectable one-way clutch is connected between the third members of the first planetary gear set and the third planetary gear set and the stationary member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. For example, a second component or element of a first planetary gear set is permanently coupled to a second component or element of the second planetary gear set. A third component or element of the first planetary gear set is permanently coupled a third component or element of the second planetary gear set. A first component or element of the second planetary gear set is permanently coupled to a second component or element of the fourth planetary gear set. A first component or element of a third planetary gear set is permanently coupled to a first component or element of the fourth planetary gear set.

Figure 1:
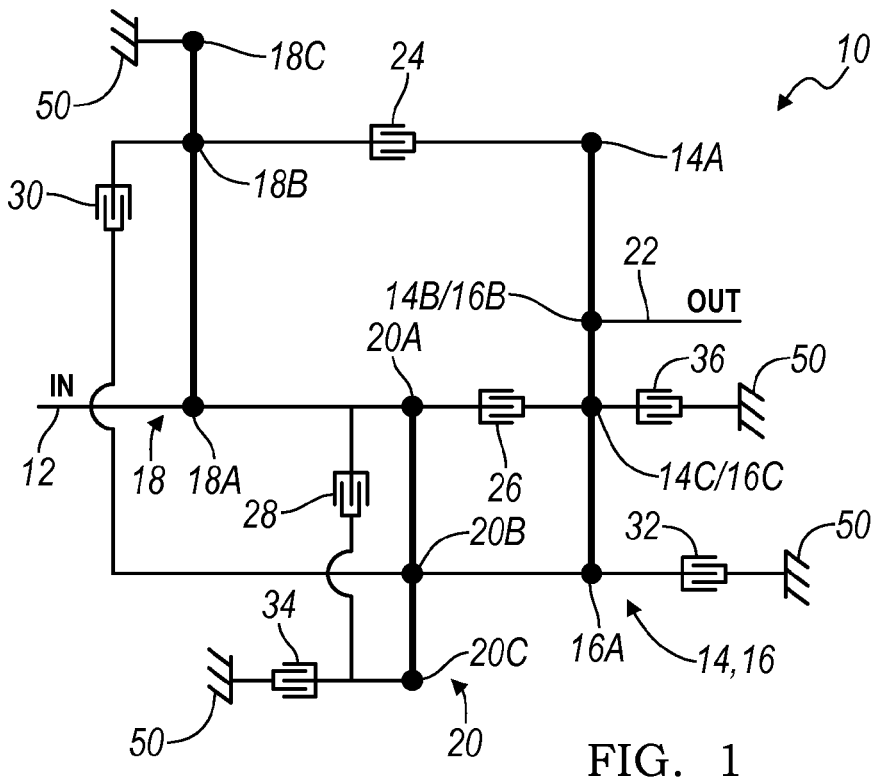
FIG. 1 is a lever diagram of an embodiment of a ten speed transmission according to the present invention.

Referring now to FIG. 1, an embodiment of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the levers for the first planetary gear set 14 and the second planetary gear set 16 have been combined into a single four node lever having: a first node 14A, a second node 14B, 16B, a third node 14C, 16C and a fourth node 16A. Thus, the second member 14B of the first planetary gear set 14 is coupled directly to the second member 16B of the second planetary gear set 16 and the third member 14C of the first planetary gear set 14 is coupled directly to the third member 16C of the second planetary gear set 16. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the first node 18A of the third planetary gear set 18 and the first node 20A of the fourth planetary gear set. The output member 22 is coupled to the second node 14B, 16B of the combined levers of the first and second planetary gear sets 14, 16. The fourth node 16A of the combined levers of the first and second planetary gear sets 14, 16 is coupled to the second node 20B of the fourth planetary gear set 20. The third node 18C of the third planetary gear set 18 is permanently coupled directly to the stationary member or transmission housing 50.

A first clutch 24 selectively connects the first node 14A of the combined levers of the first and second planetary gear sets 14, 16 with the second node 18B of the third planetary gear set 18. A second clutch 26 selectively connects the input member or shaft 12, the first node 18A of the third planetary gear set 18 and the first node 20A of the fourth planetary gear set 20 with the third node 14C, 16C of the combined levers of the first and second planetary gear sets 14, 16. A third clutch 28 selectively connects the third node 20C of the fourth planetary gear set 20 with the first node 20A of the fourth planetary gear set 20, the first node 18A of the third planetary gear set 18, and the input member 12. A fourth clutch 30 selectively connects the second node 18B of the third planetary gear set 18 with the second node 20B of the fourth planetary gear set 20 and the fourth node 16A of the combined levers of the first and second planetary gear sets 14, 16. A first brake 32 selectively connects the second node 20B of the fourth planetary gear set 20 and the fourth node 16A of the combined levers of the first and second planetary gear sets 14, 16 with a stationary member or transmission housing 50. A second brake 34 selectively connects the third node 20C of the fourth planetary gear set 20 with the stationary member or transmission housing 50. A third brake 36 selectively connects the third node 14C,16C of the combined levers of the first and second planetary gear sets 14, 16 with the stationary member or transmission housing 50.

Figure 2:
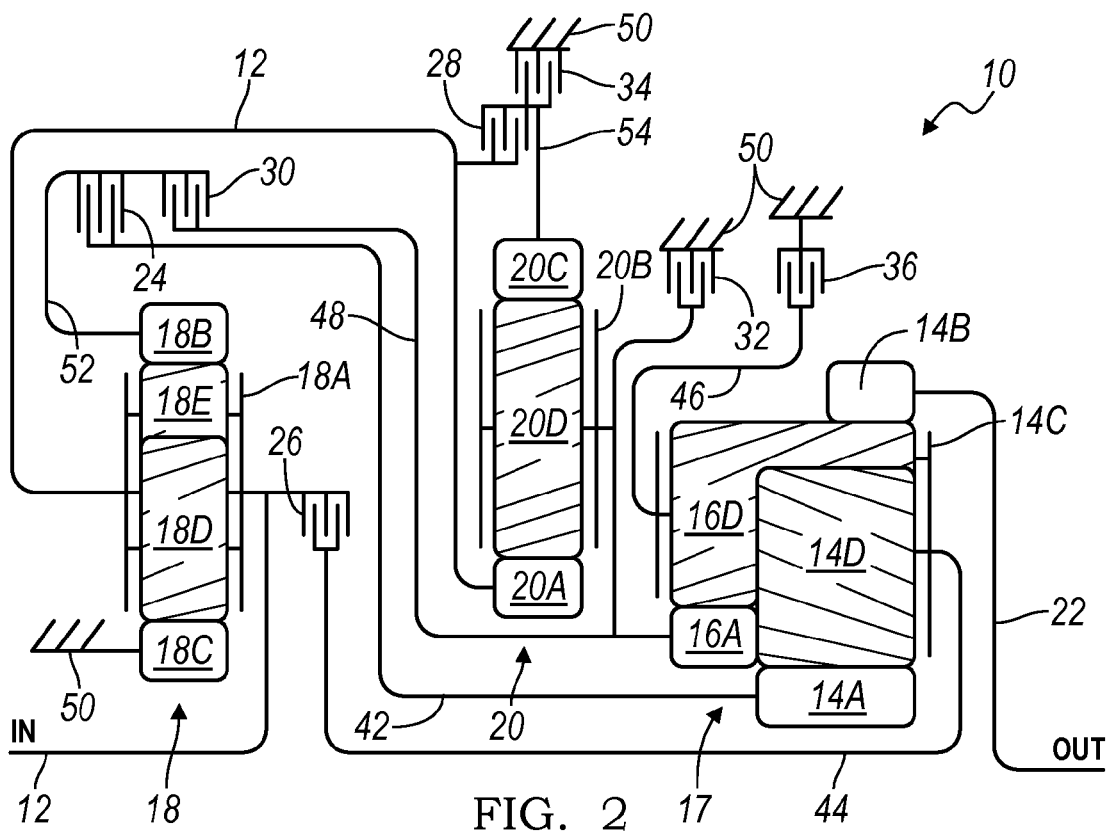
FIG. 2 is a diagrammatic illustration of an embodiment of a ten speed transmission according to the present invention.

Referring now to FIG. 2, a stick diagram presents a schematic layout of an embodiment of the ten speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 and planetary gear set 16 are combined to form a planetary gear set assembly 17. Planetary gear set assembly 17 includes a first sun gear member 14A, a second sun gear member 16A, a ring gear member 14B or alternatively 16B and a planet gear carrier member 14C or alternatively 16C that rotatably supports a first set of planet gears 14D (only one of which is shown) and a second set of pinion gears 16D. The first sun gear member 14A is connected for common rotation with a first shaft or interconnecting member 42. The ring gear member 14B is connected for common rotation with the output shaft or member 22. The planet carrier member 14C is connected for common rotation with a second shaft or interconnecting member 44 and a third shaft or interconnecting member 46. The first set of planet gears 14D are each configured to intermesh with both the sun gear member 14A and the second set of planet gears 16D. The second set of planet gears 16D are each configured to intermesh with both the sun gear member 16A, ring gear member 14B and the first set of planet gears 14D. The second sun gear member 16A is connected for common rotation with a fourth shaft or interconnecting member 48.

The planetary gear set 18 includes a sun gear member 18C, a ring gear member 18B and a planet gear carrier member 18A that rotatably supports a set of planet gears 18D (only one of which is shown) and 18E. The sun gear member 18C is connected directly to the transmission housing 50 to prevent sun gear member 18C from rotating relative to the transmission housing. The ring gear member 18B is connected for common rotation with a fifth shaft or interconnecting member 52. The planet carrier member 18A is connected for common rotation with the input member 12. The planet gears 18D are each configured to intermesh with both the sun gear member 18C and planet gears 18E. Planet gears 18E are each configured to intermesh with both the planet gears 18D and the ring gear member 18B.

The planetary gear set 20 includes a sun gear member 20A, a ring gear member 20C and a planet gear carrier member 20B that rotatably supports a set of planet gears 20D (only one of which is shown). The sun gear member 20A is connected for common rotation with the input member 12. The ring gear member 20C is connected for common rotation with a sixth shaft or interconnecting member 54. The planet carrier member 20B is connected for common rotation with the fourth shaft or interconnecting member 48. The planet gears 20D are each configured to intermesh with both the sun gear member 20C and the ring gear member 20A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 24, 26, 28, 30 and brakes 32, 34 and 36 allow for selective interconnection of the shafts or interconnecting members, members of the planetary gear sets and the housing. For example, the first clutch 24 is selectively engageable to connect the first shaft or interconnecting member 42 with the sixth shaft or interconnecting member 52. The second clutch 26 is selectively engageable to connect the input shaft or member 12 with the second shaft or interconnecting member 44. The third clutch 28 is selectively engageable to connect the input member 12 with the sixth shaft or interconnecting member 54. The fourth clutch 30 is selectively engageable to connect the fourth shaft or interconnecting member 48 with the fifth shaft or interconnecting member 52. The first brake 32 is selectively engageable to connect the fourth shaft or interconnecting member 48 with the stationary element or the transmission housing 50 in order to restrict the member 48 from rotating relative to the transmission housing 50. The second brake 34 is selectively engageable to connect the sixth shaft or interconnecting member 54 with the stationary element or the transmission housing 50 in order to restrict the member 54 from rotating relative to the transmission housing 50. The third brake 36 is selectively engageable to connect the third shaft or interconnecting member 46 with the stationary element or the transmission housing 50 in order to restrict the member 46 from rotating relative to the transmission housing 50.

Figures 3, 4:
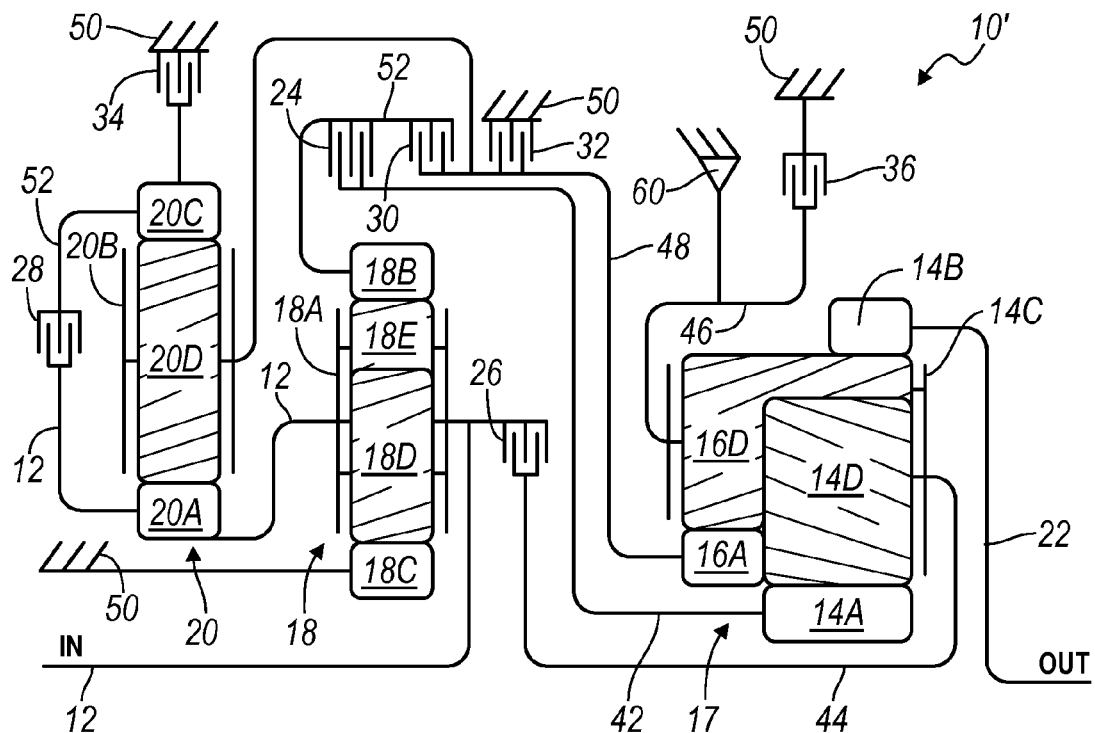
FIG. 3 is a diagrammatic illustration of an embodiment of a ten speed transmission according to the present invention.
FIG. 4 is a truth table presenting the state of engagement of the various torque transmitting elements in each of the available forward and reverse speeds or gear ratios of the transmissions illustrated in FIGS. 1, 2 and 3.

Turning to FIG. 3 a stick diagram presents a schematic layout of another embodiment of the ten speed transmission 10' according to the present invention. In FIG. 3, the numbering from the lever diagram of FIGS. 1 and 2 is carried over. However, in the transmission 10', the axial location of the third and fourth planetary gear sets 18 and 20 have been switched.

Referring now to FIGS. 2-4, the operation of the ten speed transmissions 10 and 10' will be described. It will be appreciated that transmissions 10 and 10' are capable of transmitting torque from the input shaft or member 12 to the output shaft or member 22 in at least ten forward speed or torque ratios and at least one reverse speed or torque ratio. Each forward and reverse speed or torque ratio is attained by engagement of one or more of the torque-transmitting mechanisms (i.e. first clutch 24, second clutch 26, third clutch 28, fourth clutch 30, first brake 32, second brake 34 and third brake 36), as will be explained below. FIG. 4 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmissions 10 and 10'. Of course, other gear ratios are achievable depending on the gear diameter, gear teeth count and gear configuration selected.

For example to establish a reverse gear, fourth clutch 30 and third brake 36 are engaged or activated. The fourth clutch 30 connects the fourth shaft or interconnecting member 48 with the fifth shaft or interconnecting member 52. The third brake 36 connects the third shaft or interconnecting member 46 with the stationary element or the transmission housing 50 in order to restrict the member 46 from rotating relative to the transmission housing 50. Likewise, the ten forward ratios are achieved through different combinations of clutch and brake engagement, as shown in FIG. 4.

It will be appreciated that the foregoing explanation of operation and gear states of the ten speed transmissions 10 and 10' assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. For example, the various shaft or interconnecting members described above may be combined to form a fewer number of shafts or divided into separate shafts, increasing the total number of shafts. Such variations are not to be regarded as a departure from the spirit and scope of the invention.

The following is claimed:
1. A transmission comprising:
    an input member;
    an output member;
    first, second, third and fourth planetary gear sets wherein the first, third, and fourth planetary gear sets each have first, second and third members and the second planetary gear set has at least a first member, and wherein the input member is continuously connected for common rotation with the first member of the third planetary gear set and with the first member of the fourth planetary gear set;
    a first interconnecting member continuously interconnecting the first member of the second planetary gear set with the second member of the fourth planetary gear set;
    a second interconnecting member continuously interconnecting the first member of the third planetary gear set with the first member of the fourth planetary gear set;

a third interconnecting member continuously interconnecting the third member of the third planetary gear set with a stationary member; and seven torque transmitting mechanisms each selectively engageable to interconnect at least one of the first, second, and third members with at least one other of the first, second, third members and the stationary member, and wherein the seven torque transmitting mechanisms are selectively engageable in combinations of at least two to establish at least ten forward speed ratios and at least one reverse speed ratio between the input member and the output member.

2. The transmission of claim 1 wherein a first of the seven torque transmitting mechanisms is selectively engageable to interconnect the first member of the first planetary gear set with the second member of the third planetary gear set.

3. The transmission of claim 1 wherein a second of the seven torque transmitting mechanisms is selectively engageable to interconnect the third member of the first planetary gear set with the first member of the fourth planetary gear set and the first member of the third planetary gear set.

4. The transmission of claim 1 wherein a third of the seven torque transmitting mechanisms is selectively engageable to interconnect the first member of the third planetary gear set and the first member of the fourth planetary gear set with the third member of the fourth planetary gear set.

5. The transmission of claim 1 wherein a fourth of the seven torque transmitting mechanisms is selectively engageable to interconnect the second member of the third planetary gear set with the first member of the second planetary gear set and the second member of the fourth planetary gear set.

6. The transmission of claim 1 wherein a fifth of the seven torque transmitting mechanisms is selectively engageable to interconnect the first member of the second planetary gear set and the second member of the fourth planetary gear set with the stationary member.

7. The transmission of claim 1 wherein a sixth of the seven torque transmitting mechanisms is selectively engageable to interconnect the third member of the fourth planetary gear set with the stationary member.

8. The transmission of claim 1 wherein a seventh of the seven torque transmitting mechanisms is selectively engageable to interconnect the third member of the first planetary gear set with the stationary member.

9. The transmission of claim 1 wherein the output member is continuously connected for common rotation with the second member of the first planetary gear set.

10. The transmission of claim 1 wherein the third member of the third planetary gear set and the first members of the first, second, and fourth planetary gear sets are sun gear members, the first member of the third planetary gear set, the second member of the fourth planetary gear set, and the third member of the first planetary gear set are carrier members, and the second member of the third planetary gear set, the third member of the fourth planetary gear set, and the second member of the first planetary gear set are ring gear members.

11. The transmission of claim 1 further comprising a selectable one-way clutch connected between the third members of the first planetary gear set and the third planetary gear set and the stationary member.

12. A transmission comprising:
an input member;
an output member;
first, second, third and fourth planetary gear sets wherein the first, third, and fourth planetary gear sets each have first, second and third members and the second planetary gear set has a first member;

a first interconnecting member continuously interconnecting the first member of the second planetary gear set with the second member of the fourth planetary gear set;

a second interconnecting member continuously interconnecting the first member of the third planetary gear set with the first member of the fourth planetary gear set;

a third interconnecting member continuously interconnecting the third member of the third planetary gear set with a stationary member; and a first torque transmitting mechanism selectively engageable to interconnect the first member of the first planetary gear set with the second member of the third planetary gear set;

a second torque transmitting mechanism selectively engageable to interconnect the third member of the first planetary gear set with the first member of the fourth planetary gear set and the first member of the third planetary gear set;

a third torque transmitting mechanism selectively engageable to interconnect the first member of the third planetary gear set and the first member of the fourth planetary gear set with the third member of the fourth planetary gear set;

a fourth torque transmitting mechanism selectively engageable to interconnect the second member of the third planetary gear set with the first member of the second planetary gear set and the second member of the fourth planetary gear set;

a fifth transmitting mechanism selectively engageable to interconnect the first member of the second planetary gear set and the second member of the fourth planetary gear set with the stationary member;

a sixth torque transmitting mechanism selectively engageable to interconnect the third member of the fourth planetary gear set with the stationary member; and a seventh torque transmitting mechanism selectively engageable to interconnect the third member of the first planetary gear set with the stationary member, wherein the seven torque transmitting mechanisms are selectively engageable in combinations of at least two to establish at least ten forward speed ratios and at least one reverse speed ratio between the input member and the output member.

13. The transmission of claim 12 wherein the input member is continuously connected for common rotation with the first member of the third planetary gear set and with the first member of the fourth planetary gear set.

14. The transmission of claim 12 wherein the output member is continuously connected for common rotation with the second member of the first planetary gear set.

15. The transmission of claim 12 wherein the third member of the third planetary gear set and the first members of the first, second, and fourth planetary gear sets are sun gear members, the first member of the third planetary gear set, the second member of the fourth planetary gear set, and the third member of the first planetary gear set are carrier members, and the second member of the third planetary gear set, the third member of the fourth planetary gear set, and the second member of the first planetary gear set are ring gear members.

* * * * *